Feb. 13, 1968     R. E. HURST ET AL     3,368,627
METHOD OF WELL TREATMENT EMPLOYING VOLATILE FLUID COMPOSITION
Filed March 21, 1966
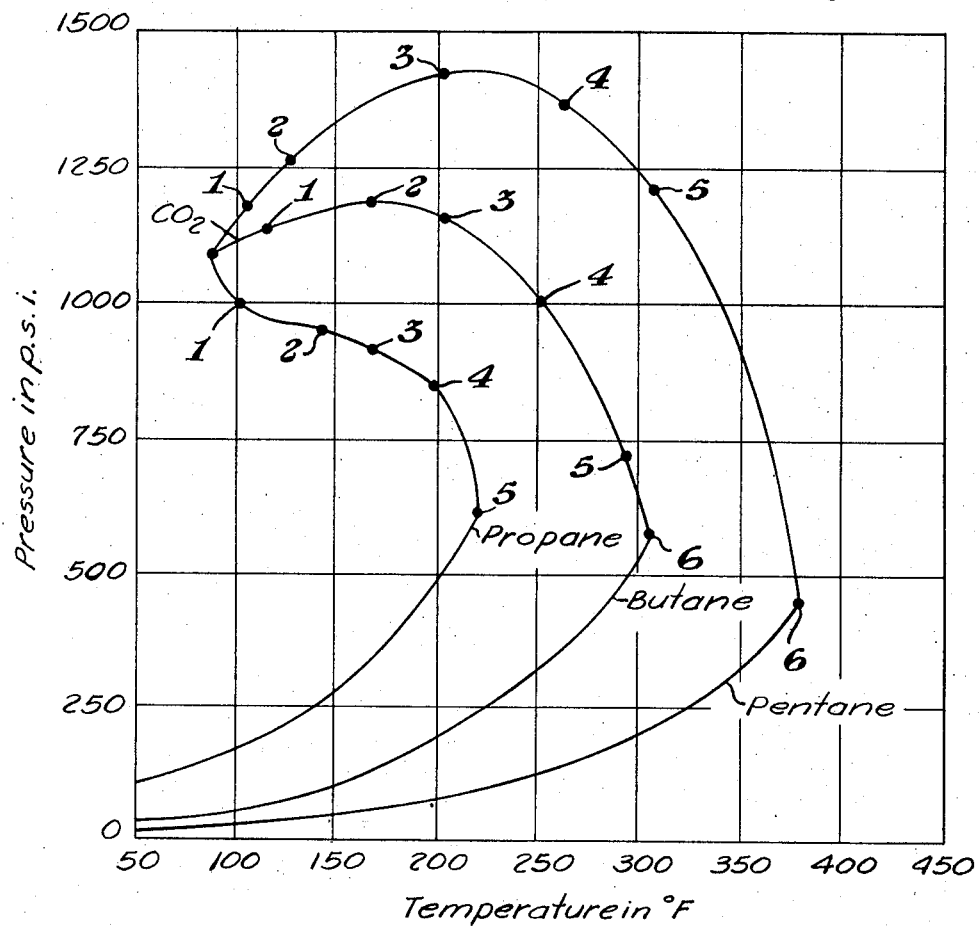
INVENTORS.
Robert E. Hurst
Charles Fred Smith
BY
C. W. Carlin
ATTORNEY

United States Patent Office

3,368,627
Patented Feb. 13, 1968

3,368,627
METHOD OF WELL TREATMENT EMPLOYING VOLATILE FLUID COMPOSITION
Robert E. Hurst and Charles F. Smith, Tulsa, Okla., assignors to The Dow Chemical Company, Midland, Mich., a corporation of Delaware
Filed Mar. 21, 1966, Ser. No. 536,062
5 Claims. (Cl. 166—42)

ABSTRACT OF THE DISCLOSURE

A method of stimulating fluid flow from a formation by way of a wellbore penetrating the formation which method consists essentially of injecting down the wellbore and into the formation a fluid azeotropic mixture which has a critical temperature sufficiently high or a critical pressure sufficiently low to remain a liquid at the temperature and pressure existing during injection down the well but a critical temperature sufficiently low or a critical pressure sufficiently high for a substantial portion of such injected fluid to be converted to a gas upon a release of the pressure applied to the liquid during injection.

---

The invention is concerned with the treatment of subterranean fluid-bearing formations.

Fluids of economic value are usually obtained from a subterranean formation via a well penetrating the formation. Many oil and gas wells are not capable of continuing to produce economically and require stimulation of production by treatment of the formation. Common methods of stimulation treatment are acidizing and fracturing. In carrying out such treatments it is conventional to inject a liquid down the wellbore and back into the formation to the extent necessary to improve fluid permeability, usually by increasing the number and/or size of passageways in the formation. In order for the treatment to be successful the treating liquids, usually oil or water or an emulsion thereof, or spent acid from an acidizing composition, must be removed from the well. In many instances this is a difficult problem which involves considerable expenditure of time and money. Present-day treatment of wells in general requires the use of relatively large volumes of fluid. For example, it is not uncommon for a well to require during treatment as much as 1000 barrels of treating composition. It is, therefore, easily seen that a so treated well when put back into production will require to have removed therefrom, before production from the reservoir can be resumed, a substantial portion if not all of the treating fluid. This represents an appreciable expenditure of time and pumping costs. For example, if a well were producing at the rate of 50 barrels per day, 20 days of production would be required before the treating fluid had been removed from the well and production in fact resumed.

The energy required to return liquids to the surface must generally be supplied to the formation. In instances where low bottom hole pressure exists and where natural permeability is low, removal of the treating composition is difficult and it sometimes remains for a time in the formation to interfere with production. To alleviate this problem, there have been developments in recent years wherein a gas or a gas-forming material is admixed with treating fluids as they are injected down a well and into the formation. Since treating pressures are substantially higher than the pressure existing in the formation and therefore the gas present in the treating fluid is compressed to some extent, it provides an energy source to assist in removal of the treating fluids after the treatment has been completed by serving as a driving force to push the treating fluids back out of the formation.

Materials heretofore suggested for this purpose have been $N_2$ and $CO_2$. $CO_2$ can be successfully injected as a liquid. However, due to the physical characteristics of $N_2$, viz. its extremely low critical temperature, it is customarily required to be injected as a gas. $N_2$ is, therefore, definitely limited in its usefulness and acceptability. $CO_2$ has a critical temperature of 88° F. and a critical pressure of 1072 p.s.i. These properties permit it to be injected as a liquid and thereafter to vaporize in the formation as the temperature of the injected fluid rises due to the heat of the formation. There is a definite limitation, however, in the use of liquid $CO_2$ which has resulted in far less than satisfactory performance in a number of treatments wherein it has been used. For example, it has been observed in formations of a depth of about 5,000 feet or more, where $CO_2$ has been employed in the treatment thereof, that the $CO_2$ is prematurely heated above its critical temperature above 88° F. As a consequence, it becomes a gas while still on its way down the wellbore. When this occurs, the $CO_2$ actually hinders the treating process and results in loss of pressure at the exposed faces of the formation.

From the above reference to known practice it is clear that a fluid which consists at least in part of a liquefied gas which remains a liquid during the injection and treatment but which thereafter reverts to a gas, upon release of pressure at the wellhead and appreciable contact of the fluid with the warmer lower strata, has been needed. We have discovered that this objective can be attained if a fluid is employed of which the critical temperature and critical pressure can be adjusted to provide these conditions.

This need is met by the invention which provides a novel improved method of well treatment.

The invention is a method of treating a well penetrated by a wellbore which consists essentially of injecting down the wellbore and into the formation a fluid azeotropic mixture which has a critical temperature sufficiently high or a critical pressure sufficiently low to remain a liquid at the temperature and pressure existing during injection down the well but a critical temperature sufficiently low or a critical pressure sufficiently high for a substantial portion of such injected fluid to be converted to a gas upon a release of the pressure applied to the liquid during injection.

Discussions of critical temperature and critical pressure are readily available, e.g. Elements of Physical Chemistry by Glasstone, published by Van Nostrand Co., Inc., New York, pp. 127 to 128.

The composition consists essentially of a mixture of $CO_2$ and at least one $C_2$ to $C_6$ hydrocarbon in proportions by volume of from 15 percent to 85 percent of each of the $CO_2$ and hydrocarbon per 100 percent of the composition. Although any one or mixture of a $C_2$ to $C_6$ hydrocarbon may be employed, propanol and butane or mixtures thereof are preferred. Minor amounts of other fluids that are either liquid or gas under normal conditions may be tolerated. The invention is preferably practiced by injecting mixtures of the liquefied hydrocarbon and $CO_2$ followed by alternate injections of an oil or an aqueous liquid, e.g. water or brine. Such treatment may be referred to as slug treatment.

In the practice of the invention, a gaseous mixture of $CO_2$ and the hydrocarbon may be liquefied, but preferably the $CO_2$ and hydrocarbon are each individually liquefied and then mixed. The resulting solution is then injected down the wellbore and back into the formation being treated. In carrying out the invention, the liquid hydrocarbon is admixed with the liquid $CO_2$ in proportions which will make sure that the mixture remains a liquid at the pressure employed during the injection step, but will at least partially gasify upon release of the injection pressures. Accordingly, a mixture of $CO_2$ and hydrocarbon is employed which has a critical temperature or critical pressure which will insure that the mixture does not appreciably gasify on the way down the wellbore at the pressure employed but at least a portion thereof will gasify at the level being treated as explained more fully below.

Because a formation being treated is usually higher in temperature than the liquid being injected and the liquid is not in contact with the formation during injection long enough to attain the temperaure of the formation, it tends to remain a liquid during injection. However, once having been injected into the formation, the liquid rises in temperature which is an aid to its changing to a gas. Release of pressure applied during injection after the liquefied gas has reached the desired level also aids gasification.

Any of the usual or conventional additives, e.g. propping sand, anti-foaming agents, inhibitors to turbulence of fluids in motion along a pipe, fluid-loss control agents, and the like, may be employed in the practice of the invention.

The following table shows the effect on critical temperature and critical pressure of admixing various proportions of liquid n-butane with liquid $CO_2$.

TABLE I.—CRITICAL CONSTANTS OF $CO_2$ AND N-BUTANE SOLUTIONS

| Mole Fraction | | Critical Temperature in ° F. | Critical Pressure in p.s.i. |
|---|---|---|---|
| n-Butane | $CO_2$ | | |
| 0 | 100 | 88 | 1,072 |
| 15 | 85 | 121 | 1,130 |
| 30 | 70 | 174 | 1,180 |
| 40 | 60 | 205 | 1,140 |
| 50 | 50 | 230 | 1,080 |
| 60 | 40 | 250 | 940 |
| 85 | 15 | 288 | 709 |
| 100 | 0 | 308 | 583 |

Reference to the table shows that desirably higher critical temperatures are conveniently provided by increasing the mole fraction of the hydrocarbon, as illustrated by the n-butane, and correspondingly decreasing the mole fraction of the $CO_2$. The table also shows that below about 15 percent liquefied hydrocarbon, the critical temperature is undesirably low but that above about 85 percent liquefied hydrocarbon, the critical temperature rises beyond usual needs and at the same time the critical pressure drops rapidly. Mole fractions therebetween have desirable critical temperatures and critical pressures. For example, the table shows that butane can be added to liquid $CO_2$ at 30 percent mole fraction and thereby provide a solution of the hydrocarbon in the $CO_2$ which will remain a liquid at any temperature up to 174° F. at a pressure of 1180 p.s.i. or more, but will convert to a gas when the pressure is reduced substantially so long as the temperature is less than 174° F.

The annexed graph comprising the drawing shows in three curves the critical temperature and pressure of solutions of each of propane, butane, and pentane in $CO_2$. There are shown highly satisfactory solutions of a hydrocarbon and $CO_2$ for use in the practice of the invention under the temperature and pressure conditions existing in a subterranean formation. For example, the drawing shows that solutions of selected hydrocarbons and $CO_2$ can be readily prepared which have critical temperatures below the temperature of formations being treated, when injected at relatively high pressures, but which will become gases at formation temperature when the pressure is released.

In Table II below are plotted critical temperature-critical pressure values of mixtures of each of propane, butane, and pentane with $CO_2$.

The table consists of three parts having headings dependent on the hydrocarbon concerned which corresponds to that curve on the graph as identified by the appropriate hydrocarbon name. The values in each of three parts of Table II bear corresponding numbers to those on each curve of the graph.

TABLE II.—PURE $CO_2$, $CO_2$-HYDROCARBON MIXTURES, AND PURE HYDROCARBON

| | Composition, Mole percent | Critical Temp. in ° F. | Critical Pressure in p.s.i. |
|---|---|---|---|
| | 100 $CO_2$ | 88 | 1,072 |
| | $CO_2$ and Propane: | | |
| (1)* | 79 $CO_2$–21 $C_3H_8$ | 101 | 1,002 |
| (2) | 50 $CO_2$–50 $C_3H_8$ | 147 | 986 |
| (3) | 35 $CO_2$–65 $C_3H_8$ | 166 | 967 |
| (4) | 15 $CO_2$–85 $C_3H_8$ | 199.4 | 790 |
| (5) | 100 $C_3H_8$ | 240 | 570 |
| | 100 $CO_2$ | 88 | 1,072 |
| | $CO_2$ and Butane: | | |
| (1) | 85 $CO_2$–15 $C_4H_{10}$ | 119 | 1,122 |
| (2) | 70 $CO_2$–30 $C_4H_{10}$ | 169 | 1,181 |
| (3) | 60 $CO_2$–40 $C_4H_{10}$ | 203 | 1,140 |
| (4) | 37 $CO_2$–63 $C_4H_{10}$ | 254 | 1,000 |
| (5) | 14 $CO_2$–86 $C_4H_{10}$ | 288 | 709 |
| (6) | 100 $C_4H_{10}$ | 308 | 550 |
| | 100 $CO_2$ | 88 | 1,072 |
| | $CO_2$ and Pentane: | | |
| (1) | 95 $CO_2$–5 $C_5H_{12}$ | 107 | 1,148 |
| (2) | 90 $CO_2$–10 $C_5H_{12}$ | 126 | 1,250 |
| (3) | 80 $CO_2$–20 $C_5H_{12}$ | 203 | 1,441 |
| (4) | 65 $CO_2$–35 $C_5H_{12}$ | 269 | 1,352 |
| (5) | 45 $CO_2$–55 $C_5H_{12}$ | 310 | 1,200 |
| (6) | 100 $C_5H_{12}$ | 375 | 480 |

*Note.—The numbers identify points on the curves of the graph comprising the drawing.

The graph represents critical constants of various mole fractions of the indicated hydrocarbons with $CO_2$, starting with 100 mole percent of the hydrocarbon and zero mole percent of $CO_2$ at the apex of the curves (i.e. highest temperature shown on each curve) and progressing to 100 mole percent of $CO_2$ and zero mole percent of the hydrocarbon at the point labelled "$CO_2$" shown at 88° F. and 1072 p.s.i. The proportions of each of the three hydrocarbons and $CO_2$ necessary to provide the critical temperature and critical pressure are plotted independently on each of the three curves. The apex of each curve (located at the highest temperature shown) is the pure hydrocarbon of the curve so labelled.

The portion of each curve which is the lower portion thereof and lies below the critical temperature-critical pressure of each pure hydrocarbon (the apex of each curve) is a vapor pressure curve, i.e. any point on such lower portion of each curve represents a pressure and temperature at which the respective pure hydrocarbon boils. For example at 100° F., propane boils at a pressure of about 150 p.s.i., butane at about 100 p.s.i., and pentane at about 50 p.s.i.

Any point to the right and/or below a given point on a curve, when considered to have the same composition as that point plotted on the curve, is a gas. Contrariwise, any point to the left and/or above a given point on a curve, when considered to have the same composition as that point plotted on the curve, is a liquid.

The following example illustrates a mode of carrying out the invention.

*Example 1*

A formation penetrated by a relatively deep well of at least 5,000 feet, penetrating a fluid-bearing formation, is required to be treated to stimulate the production of fluid therefrom. The bottom hole temperature is ascertained to be just over 230° F. which is clearly in excess of the critical temperature of $CO_2$. Liquid $CO_2$ is admixed with liquefied butane in a proportion of about 50 percent mole fraction of butane and about 50 percent mole fraction of $CO_2$. The resulting solution is blended with sand at a concentration of 1 pound thereof per gallon of liquid $CO_2$ and butane and the resulting slurry injected down the well and forced back into the formation at a pressure of about 2200 p.s.i. which fractures the formation. The liquid carries the sand into the fractures. Fracturing is thereby accomplished while the fluid is liquid inasmuch as the applied pressure is greater than the critical pressure and the liquid is as yet at a lower temperature than that of the formation. The pressure is thereafter released whereby a large proportion of the fluid, aided by prolonged contact with the higher temperature formation, reverts to gas. The injected fluid, now largely gas, flows back out of the well. Thereafter the well is put back into production, the returning gas acting as a driving medium to move the fluid produced in the formation to the wellbore and a carrying medium to lift it to the surface.

*Example 2*

A second example, illustrative of the practice of the invention, is one wherein a fluid-bearing calcium carbonate-containing formation is desired to be acidized. The temperature of the formation is about 250° F. which is very definitely above the critical temperature of $CO_2$. 5 to 25% by weight HCl gas is admixed with a 60% to 40% by volume solution of n-butane and $CO_2$, consisting of from 60 to 40 mole fraction of n-butane, balance $CO_2$, and the solution injected down the well and into contact with the formation. The thus injected HCl gas-containing solution is allowed to remain in contact with the formation for a time sufficient for the HCl to combine with water in the formation and the resulting acid to react, with at least a substantial portion of the calcium carbonate present. Thereafter, the pressure is released at the wellhead and the spent fluid, now largely gaseous, allowed to flow back out of the well until an appreciable portion thereof is removed. The well is then put back into production.

The practice of the invention as illustrated by the examples provides a method of use of a solution of selected liquefied hydrocarbon and $CO_2$, which remains liquid at injection pressures, even at relatively high formation temperatures, and which, upon release of pressure at the wellhead and contact with the higher temperature formation, is converted to gases and leaves the formation and wellbore largely by its own stored energy, carrying with it some of the other liquids present. This insures better fracturing and desirably reduces or eliminates the need for subsequent swabbing.

*Example 3*

A formation of the nature of that treated in Example 1, penetrated by a wellbore, is to be fractured according to the invention employing alternate slugs of (1) the liquefied solution of a hydrocarbon and $CO_2$ and (2) water or brine. The liquefied mixture is injected first at fracturing pressures followed by injection of the brine or water and the injection of each repeated as often as is deemed advisable. The liquefied hydrocarbon-$CO_2$ fluid, being injected first, is subsequently more-or-less trapped, in the fractures created by the subsequently injected aqueous liquid. The pressure is thereafter released at the wellhead whereupon the hydrocarbon-$CO_2$ solution, being also raised in temperature, becomes a gas and aids in removal of water or brine from the formation and wellbore.

*Example 4*

A formation of the nature of that treated in Example 3 is acidized by injecting alternate slugs of (1) a solution of liquefied hydrocarbon and $CO_2$ followed by (2) a 3 percent to 30 percent aqueous solution of HCl. The first injected solution of liquefied hydrocarbon and $CO_2$, similarly as in Example 3, upon release of pressure at the wellhead following the acid attack on the formation, aids in removal of the acid.

*Example 5*

A well completed in an oil-bearing limestone formation at 9,000 feet and having a static formation temperature of 180° F. is treated to stimulate production. It is cased with a 7-inch casing to the oil bearing formation. Aqueous HCl containing sand as a propping agent, is emplaced in the formation by hydraulically fracturing, employing slugs of liquefied gaseous solutions of $CO_2$ and butane interspersed between slugs of the acid and sand. The $CO_2$ butane solution consists of 0.7 mole fraction of carbon dioxide to 0.3 mole fraction of butane. This solution has a critical temperature of 174° F. and a critical pressure of 1,180 p.s.i. Such a blend is made using about 0.9 gallon liquid carbon dioxide to 1.68 gallons of butane. The treatment proceeds as follows: 50,000 gallons of a 15% solution of HCl in water, thickened with guar gum and carrying 0.75 pound of 20 to 40 mesh round sand per gallon, is pumped into the formation by alternating 5,000-gallon slugs of acid with 3,500-gallon slugs of a mixture of butane and $CO_2$, starting and finishing with slugs of the acid. The pumping rate down the 7-inch casing of the well is 60 barrels per minute at an injection pressure of 4,200 p.s.i. The static temperature of the well exceeds the critical temperature of the butane-$CO_2$ solution but, since the $CO_2$ solution is preceded by a slug of acid (as stated), the acid slug will not have risen substantially above atmospheric temperature and consequently the wellbore and that portion of the formation in contact therewith are cooled below the critical temperature of the butane-$CO_2$ solution while being injected and when first emplaced in the formation. During and immediately following injection of the acid and the liquefied gas solution, the acid chemically attacks the limestone, as desired. After injection is complete, the well is opened at the wellhead and, as the formation heat warms the liquefied solution to above 174° F., it gasefies and causes the acid (now substantially spent upon the limestone) to flow back to the surface without the aid of swabbing or pumping. The liquefied hydrocarbon-$CO_2$ fluid thus also initiates production of oil from the formation without mechanical lifting. The production rate is found to be times that prior to the treatment, indicating the stimulating effect of the treatment upon the formation.

Having described our invention what is claimed and desired to be protected by Letters Patent is:

1. The method of treating a subterranean formation penetrated by a wellbore which comprises injection down the wellbore and into the formation a fluid mixture consisting essentially of between about 15% and 85% mole fraction of each of (1) a liquefied $C_2$ to $C_6$ hydrocarbon and (2) liquefied $CO_2$ to make a total of 100%, which fluid mixture is a liquid at the pressure and temperature employed while being injected but which reverts to a gas at formation temperature and pressure, and thereafter releasing the pressure on the injected fluid mixture whereby a large proportion of the fluid reverts to gas and flows back out of the formation and up the wellbore.

2. The method according to claim 1 wherein said hydrocarbon is selected from the class consisting of propane, butane, and pentane.

3. The method according to claim 1 wherein said fluid mixture is injected at pressures sufficiently hight to fracture the formation.

4. The method according to claim 1 wherein HCl gas is admixed with said fluid mixture in an amount of between about 3 and 30 percent by weight of the mixture to effect acidification of a $CaCO_3$-containing formation when brought into contact therewith.

5. The method according to claim 1 wherein the injection of said fluid mixture consisting essentially of a liquefied $C_2$ and $C_6$ hydrocarbon and liquefied $CO_2$ is interspersed with injections of a fluid which is a liquid at the temperatures and pressures encountered at any stage of the treatment.

References Cited

UNITED STATES PATENTS

| 3,065,790 | 11/1962 | Holm | 166—9 X |
| 3,108,636 | 10/1963 | Peterson | 166—42 |
| 3,170,517 | 2/1965 | Graham et al. | 166—42 |
| 3,195,634 | 7/1965 | Hill | 166—42 |

JAMES A. LEPPINK, *Assistant Examiner.*